A. R. SHAW.
LONG ARM FRUIT PICKER.
APPLICATION FILED JULY 10, 1912.
1,068,536. Patented July 29, 1913.
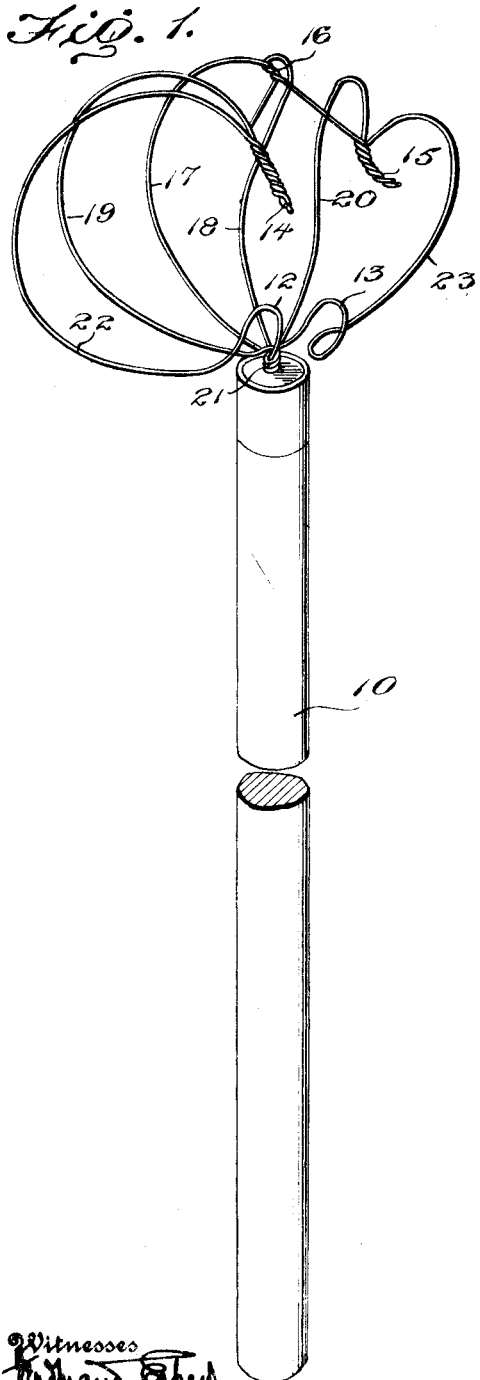
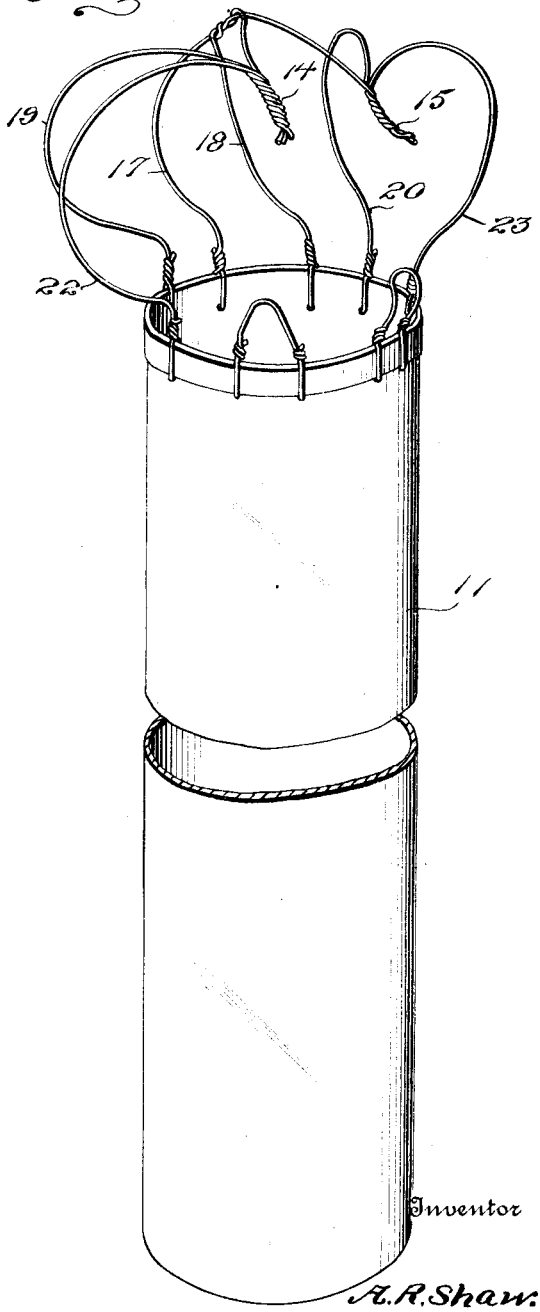

UNITED STATES PATENT OFFICE.

ALEXANDER R. SHAW, OF BILLINGS, MONTANA.

LONG-ARM FRUIT-PICKER.

1,068,536.  Specification of Letters Patent.  Patented July 29, 1913.

Application filed July 10, 1912. Serial No. 708,718.

*To all whom it may concern:*

Be it known that I, ALEXANDER R. SHAW, a citizen of the United States, residing at Billings, in the county of Yellowstone and State of Montana, have invented certain new and useful Improvements in Long-Arm Fruit-Pickers, of which the following is a specification.

This invention relates to improvements in fruit pickers, and has for one of its objects to simplify and improve the construction and increase the efficiency and utility of devices of this character.

Another object of the invention is to provide a simply constructed device which may be cheaply constructed and adapted to pick fruit from otherwise inaccessible parts of a tree.

With these and other objects in view, the invention consists in certain novel features of construction as hereafter shown and described, and then specifically pointed out in the claims, and in the drawings illustrative of the preferred embodiment of the invention, Figure 1 is a perspective view of the improved device in its simpler form; Fig. 2 is a perspective view of a modified form of the construction.

Corresponding and like parts are referred to in the following description and indicated in all the views of the drawings by the same reference characters.

The improved device comprises in general a supporting stock which may be in the form of a solid pole or rod represented at 10, or in tubular form, as represented at 11. The picker portion of the improved device comprises a fruit receiving cage formed wholly of wire and consists of rear arms 17—18 secured at their lower ends to the stock and bowed in opposite directions and thence bent forwardly and entwisted at 16 intermediate the ends with the terminals presented forwardly and spaced apart. Forward arms 22—23 are likewise secured at their lower ends in the stock and bowed in opposite directions, and intermediate arms 19—20 connected at their lower ends in the stock and bowed in opposite directions. The upper terminal of one of the rear arms and the upper terminals of the forward arm and side arm at one side of the cage are united by entwisting portions of the wire of which they are constructed, as shown at 14, while the upper terminal of the other rear arm and the upper terminals of the forward arm and intermediate arm at the other side of the cage are entwisted, as shown at 15. Stop loops 12—13 are formed at the forward lower portion of the cage to coact with the lower portions of the several arms to form a shallow receptacle for the fruit and thus prevent the latter from rolling from the cage after being severed. In Fig. 1 the loops are formed as a part of the forward arms 22—23, while in Fig. 2 the stop loops are separate members connected to the tubular stop. By this simple means it will be obvious that the several arms reinforce and support each other and are effectually prevented from displacement by lateral strains. At their lower ends the various arms are entwisted, as shown at 21, to form a spur or stud which is engaged in the aperture of the stock 10 and thus unites the cage to the stock.

In the modified structure shown in Fig. 2, the terminals of the various members 17—18—19—20—22—23 are connected to the rim of the tubular stock 11, and preferably spaced at uniform distances apart around the rim, while the stops 12—13 are likewise independently connected to the rim. The portions of the members 17—18 between the arms 14—20 and the twisted connection 16, are diverged toward the latter and thus form a gradually reduced cavity which is adapted to be placed around the stem of the fruit to be severed, and thus serve as the "knife" or severing member of the picker.

When the structure shown in Fig. 1 is employed, the arms 14—15 are passed at each side of the stem of the fruit with the fruit located within the "cage" formed by the various rearwardly and laterally curving wires and force applied to break the stem and deposit the fruit within the cage. The rod is then lowered until the fruit can be removed manually or caused to fall therefrom by overturning the device. When the structure shown in Fig. 2 is employed, the same operation is pursued except that the fruit instead of falling into the cage passes into the tube 11 and passes from thence at the lower end where it is caught in the hand of the operator. Either of the forms shown may be employed.

The improved device is simple in construction, can be inexpensively manufactured and of any required size to adapt it to fruit of various kinds.

The stock 10 or 11 may be of any required length to enable the device to be employed for gathering otherwise inaccessible fruit. The fruit may thus be picked by the improved device without the necessity of employing ladders or other devices for elevating the operator.

The claws or arms of the fruit picker may be made of cast iron or steel if desired, the claims following, covering the structure of the device irrespective of the material of which it is made.

Having thus described the invention, what is claimed as new is:

1. A fruit picker including a supporting stock, a fruit receiving cage comprising rear arms connected at their lower ends in the stock and bowed in opposite directions and united intermediate their ends and with the upper terminals extended forwardly and spaced apart, side arms connected at their lower ends in the stock and bowed in opposite directions and united respectively at their upper terminals to the terminals of the rear arms.

2. The fruit picker including a supporting stock, a fruit receiving cage comprising rear arms connected at their lower ends in the stock and bowed in opposite directions and united intermediate their ends and with the upper terminals extended forwardly and spaced apart, forward arms connected at their lower ends in the stock and bowed in opposite directions, upwardly directed stop loops near the stock, intermediate arms connected at their lower ends in the stock and bowed in opposite directions, means for connecting the upper terminals of the forward arm and intermediate arm at one side of the cage to one of the upper terminals of one of the rear arms, and means for connecting the upper terminals of the forward arm and intermediate arm at the other side of the cage to the upper terminal of the other rear arm.

3. A fruit picker including a supporting stock and a fruit receiving cage comprising rear arms connected at their lower ends in the stock and bowed in opposite directions and twisted intermediate their ends and with the upper terminals extended forwardly and spaced apart, forward arms connected at their lower ends in the stock and bowed in opposite directions, intermediate arms connected at the lower ends in the stock and bowed in opposite directions, the upper terminals of one of said rear arms being entwisted with the upper terminals of the forward arm and intermediate arm at one side of the cage, and with the upper terminal of the other rear arm entwisted with the upper terminals of the forward arm and intermediate arm at the other side of the cage.

4. A fruit picker including a supporting stock, a fruit receiving cage comprising rear arms connected at their lower ends in the stock and bowed in opposite directions and united intermediate their ends and with the upper terminals extended forwardly and spaced apart, forward arms connected at their lower ends in the stock and bowed in opposite directions, intermediate arms connected at their lower ends in the stock and bowed in opposite directions, means for connecting the upper terminals of the forward arms and intermediate arms at one side of the cage to one of the upper terminals of one of the rear arms, and means for connecting the upper terminals of the forward arm and intermediate arm at the other side of the cage to the upper terminal of the other rear arm.

In testimony whereof I affix my signature in presence of two witnesses.

ALEXANDER R. SHAW. [L. S.]

Witnesses:
LEON S. FAIRLEY.
FLORENCE M. HUBBARD.

Copies of this patent may be obtained for five cents each, by addressing the "Commissioner of Patents, Washington, D. C."